United States Patent [19]
Thornbury et al.

[11] Patent Number: 5,168,935
[45] Date of Patent: Dec. 8, 1992

[54] HORSE HOOF PICK INCLUDING APPLICATOR

[76] Inventors: Dean J. Thornbury; James P. Thornbury, both of 13019 Adah La., Poway, Calif. 92064

[21] Appl. No.: 696,121

[22] Filed: May 1, 1991

[51] Int. Cl.⁵ .............................................. A01L 15/00
[52] U.S. Cl. .................................... 168/48.1; 401/139
[58] Field of Search ............... 168/45, 48.1; 30/164.7; 7/167; 401/137, 139

[56] References Cited

U.S. PATENT DOCUMENTS

| | | | |
|---|---|---|---|
| 2,770,826 | 11/1956 | Curfman | 401/139 |
| 3,325,850 | 6/1967 | Frattallone | 401/137 |
| 4,289,153 | 9/1981 | Paccione | 401/137 X |

FOREIGN PATENT DOCUMENTS 2501496  8/1976  Fed. Rep. of Germany ........ 168/45

Primary Examiner—Robert P. Swiatek
Attorney, Agent, or Firm—Calif Kip Tervo

[57] ABSTRACT

A maintenance device for hooves, such as horse hooves, includes a hoof pick and a hoof dressing applicator including dressing. The hoof pick handle includes a tubular section having an internal cavity containing hoof liquid dressing. A dressing dispensing applicator on the other end of the handle applies the dressing to a hoof. A cap covers the applicator so that the dressing is not unintentionally dispensed. An exemplary embodiment includes a spray pump dressing applicator. In another exemplary embodiment, a dabber is used as a dressing applicator.

4 Claims, 1 Drawing Sheet

HORSE HOOF PICK INCLUDING APPLICATOR

BACKGROUND OF THE INVENTION

1. Field of the Invention

This invention relates in general to a tool for the care of horse hooves and more specifically to a tool that includes both a hoof pick and a hoof dressing applicator.

2. Background of the Invention

Hooves on animals, such as horses, require much attention for the hoof to remain in a healthy and pain-free condition. For example, foreign material is often collected in the open area on the underside of the hoof. The foreign material often includes stones and other hard objects that are forced up into the area known as the frog. If these are not removed, pain and injury result and the horse may go lame. A hoof pick is used to remove stones and such from the underside of the hoof. A hoof pick typically comprises a rather thick, but usually resilient, metal prong attached to a stout handle. Typically, the tip of the pick is worked under the stone and the stone is pried out. A conscientious equestrian carries a horse pick at all times.

Other foreign matter collecting in the hoof includes old straw and feces. If this is not removed often, a fungus known as thrush may develop in the foot and lead to lameness. A hoof pick is also used to clean out this matter. Various liquid products are applied to the foot to clean it and to cure thrush and an equestrian may also carry a dispenser for one of these.

Horses hooves should be dressed often. Horses hooves are pliable, but they have a propensity for drying out thereby becoming brittle which leads to cracking. To maintain the pliability of the hoof, a dressing is applied to the hoof wall, heel, sole, frog, and coronet. The dressing is typically an oil-based solution that is liberally applied to the hoof. It is desirable that an equestrian also carry a dispenser of dressing while riding.

Conventionally, to clean and dress the bottom of the hoof, the hoof is picked up and then held with one hand while the other hand performs the operation. First, the hoof is cleaned with a pick. Upon completion of the cleaning, the hoof is lowered, the dressing applicator is fetched, and the hoof raised again for application of the dressing. Because raising and positioning the hoof is hard work and the entire operation is time consuming, equestrians do not perform the operation as often as is good for the animal.

Therefore, it would be desirable to have a single tool incorporating both a hoof pick and a dressing applicator such that the equestrian can both clean and dress the bottom of the hoof in a single sitting.

SUMMARY OF THE INVENTION

According to the invention, a maintenance device for hooves, such as horse hooves, includes a hoof pick and a hoof dressing applicator including dressing. The hoof pick handle includes a tubular section having an internal cavity containing hoof liquid dressing. A dressing dispensing applicator on the other end of the handle applies the dressing to a hoof. A cap covers the applicator so that said dressing is not unintentionally dispensed. An exemplary embodiment includes a spray pump dressing applicator. In another exemplary embodiment, a dabber is used as a dressing applicator.

Other features and many attendant advantages of the invention will become more apparent upon a reading of the following detailed description together with the drawings in which like reference numerals refer to like parts throughout.

DETAILED DESCRIPTION OF THE INVENTION

Figure 1:
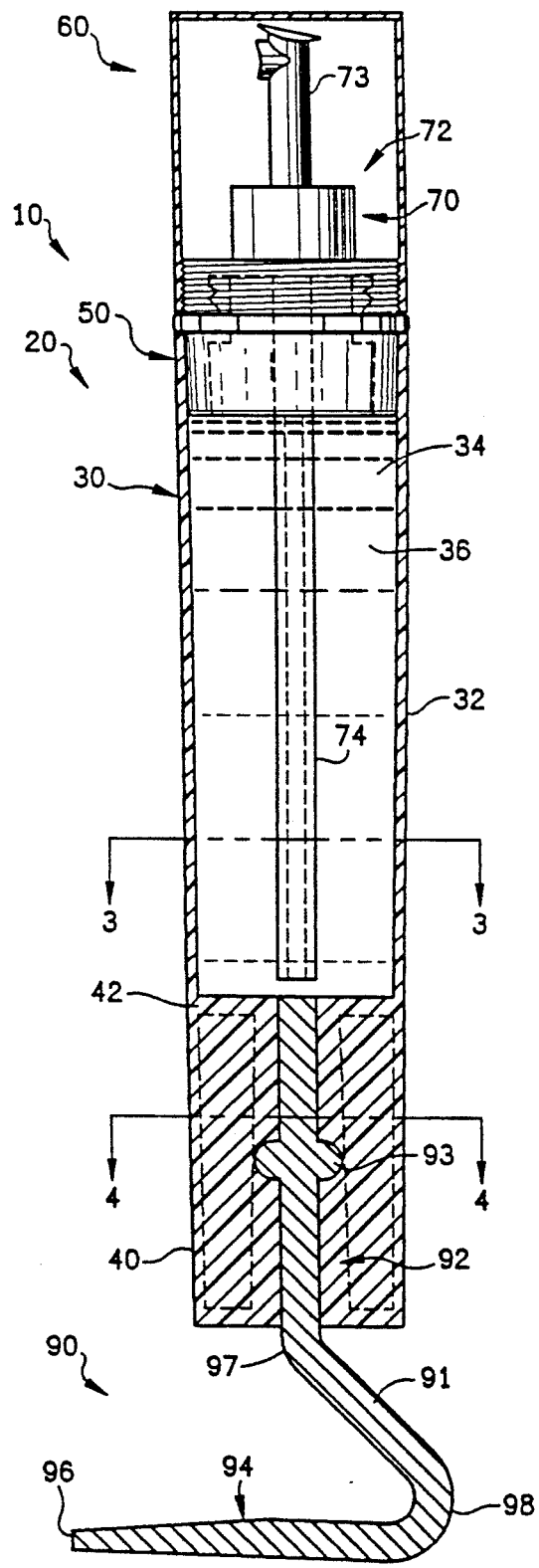
FIG. 1 is longitudinal cross sectional view of a preferred embodiment of the hoof pick and dressing applicator of the present invention including a pump spray dressing applicator.

With reference now to the drawing, and more particularly to FIG. 1 thereof, there is shown a cross sectional view of an exemplary embodiment of the hoof pick and dressing applicator, denoted generally as 10, of the present invention. The hoof pick and applicator 10 comprises a handle, denoted generally as 20, and a hoof pick, denoted generally as 90.

Figure 3:
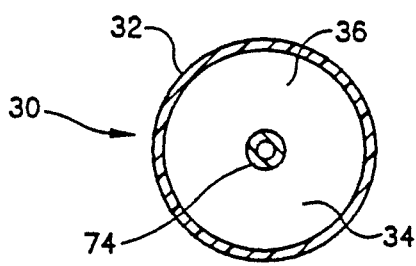
FIG. 3 is a sectional view of the tubular handle section taken on line 3—3 of FIG. 1.

Handle 20 is made of any suitable material, such as strong injected molded plastic and is approximately seven to eight inches in length and one and one-eighth inches in diameter. Handle 20 includes a tubular section, denoted as generally as 30, and a cap section, denoted generally as 60. The tubular section 30 of handle 20 has a wall creating a closed end 40 and a dressing dispensing end 50. In the exemplary embodiment shown in FIG. 1, handle section 30 has a cylindrical outer wall 32 surrounding an internal cavity 34 containing dressing 36. FIG. 3 is a transverse cross section of handle section 30 illustrating outer wall 32 and dressing 36 in the internal cavity 34.

Returning to FIG. 1, hoof pick 90 is mounted in handle closed end 40. Hoof pick 90 is made of strong, stiff, preferably slightly resilient material, such as one-quarter inch diameter zinc plated steel wire. Pick 90 includes an elongate anchor section 92 that is deeply and firmly embedded in handle closed end 40 and includes means, such as bulge 93 to retain pick 90 in tubular handle 30 and prevent it from pulling out during extraction of stones from a hoof.

Figure 4:
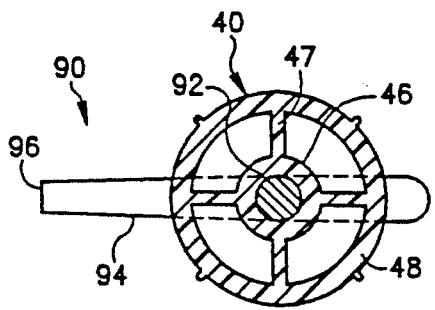
FIG. 4 is a sectional view of the hoof pick mounting taken on line 4—4 of FIG. 1.

FIG. 4 is a transverse cross sectional view of tubular handle closed end 42 and the pick mounting taken along line 4—4 of FIG. 1. In the exemplary embodiment, to cut down on weight, the pick anchor portion 92 is mounted in a central core 46 connected to the outer wall 48 by strong webbing sections 47.

Pick 90 includes a drawing section 94 terminating in tip 96. Drawing section 94 is substantially transverse to the axis of handle 20. Pick 90 at tip 96 tapers to a flattened screw-drive configuration. The transition of the pick 92 from the anchor section 92 to the transverse 94 must includes a bend. Preferably, the bend is comprised of a reverse bend 97 of forty five degrees and then a forward bend 98 of one hundred thirty five degrees. Bends 97,98 add to the resiliency of the pick 90.

Turning now to the dressing dispensing end 50 of handle tubular section 30, a dressing applicator, denoted generally as 70, such as spray pump 72, is mounted in tubular handle end 50. Spray pump 72 is of conventional type having a pump nozzle 73 and dressing take up straw 74 in fluid communication with dressing 36 in cavity 34. Straw 74 can be long, as shown, or short, to use the applicator in the upright or up-side down position as desired.

Cap section 60 attaches over dressing applicator 70 and prevents activation of applicator 70 and prevents dressing from leakage. This is particularly important when the device 10 is kept in a saddlebag or the like while riding. Cap 60 is preferably threadably attached so as to prevent its disconnection when bouncing around in a saddlebag during riding.

Figure 2:
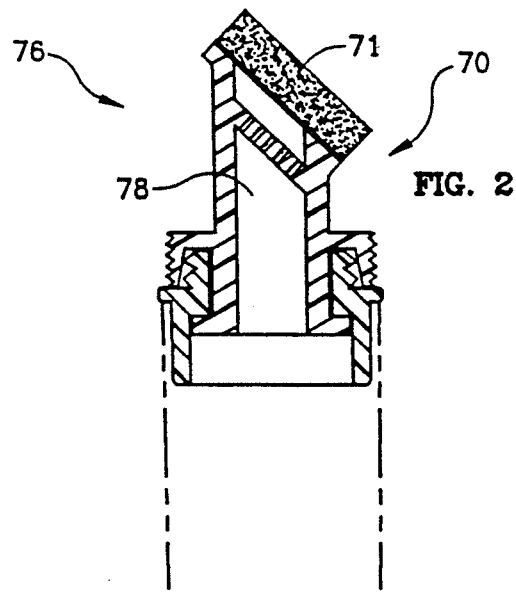
FIG. 2 is a cross sectional view of the dressing dispensing end including an alternate applicator of the dabber type.

FIG. 2 illustrates an alternate dressing applicator 70, such as dabber applicator 76. Dabber applicator 76 is of the conventional type with internal channel 78 providing passage for dressing to non-drip sponge 71. Cap 60 would cover the dabber 76 in storage.

Dressing 76 maintains pliable healthy hooves and comprises petrolatum, oil, lanolin, tallow, turpentine, pine tar, wax or rosin and phenol added as a preservative.

Having described the invention, it can be seen that it provides a very convenient device for efficient care and maintenance of horse hooves.

Although a particular embodiment of the invention has been illustrated and described, various changes may be made in the form, composition, construction, and arrangement of the parts without sacrificing any of its advantages. Therefore, it is to be understood that all matter herein is to be interpreted and illustrative and not in any limiting sense and it is intended to cover in the appended claims such modifications as come within the true spirit and scope of the invention.

We claim:

1. A hoof maintenance device comprising:
    a substantially cylindrical hoof pick handle having a longitudinal axis and comprising:
        a tubular section having an internal cavity containing liquid horse hoof dressing; said tubular section including:
            a closed end; and
            a liquid hoof dressing dispensing end opposite said closed end including:
                applicator means in fluid communication with said internal cavity for applying said liquid hoof dressing;
        a cap section movable from a capping position, attached to said tubular section dispensing end and covering said applicator means such that said liquid hoof dressing cannot be dispensed, to a dispensing position wherein said applicator means is accessible for dispensing said liquid hoof dressing; and
    a hoof pick attached to said handle tubular section closed end.

2. The hoof maintenance device of claim 1 wherein: said applicator means is a spray pump.

3. The hoof maintenance device in claim 1 wherein: said applicator means is a dabber.

4. The hoof maintenance device of claim 1 wherein: said hoof pick comprises a strong, resilient, metal rod member having:
    an inner end attached to said handle closed end; and
    an outer end having a drawing section substantially at right angles to the longitudinal axis of said handle and terminating in a tip adapted for scraping foreign matter from a horse hoof.

* * * * *